United States Patent [19]

Sunderland

[11] Patent Number: 4,884,732
[45] Date of Patent: Dec. 5, 1989

[54] GAME BAG FOR SCUBA DIVER

[76] Inventor: Howard F. Sunderland, 3939 Allin, Long Beach, Calif. 90803

[21] Appl. No.: 244,721

[22] Filed: Sep. 14, 1988

[51] Int. Cl.⁴ .................................................. A45F 3/00
[52] U.S. Cl. ..................................... 224/252; 224/224; 224/235; 224/240; 224/242; 224/920; 43/55
[58] Field of Search ............... 224/921, 920, 224, 252, 224/103, 191, 196, 226, 235, 240, 242, 254, 269, 236, 237; 383/102; 43/54.1, 55; 405/185, 186

[56] References Cited

U.S. PATENT DOCUMENTS

| | | | |
|---|---|---|---|
| 2,323,318 | 7/1943 | Farkas | 43/55 |
| 2,795,889 | 6/1957 | Garland | 224/920 |
| 3,777,498 | 12/1973 | Andrews et al. | 383/102 |
| 4,775,082 | 10/1988 | Krache | 224/920 |

Primary Examiner—Linda J. Sholl
Attorney, Agent, or Firm—Timothy T. Tyson

[57] ABSTRACT

A game bag for a scuba diver is provided having a flexible tubular envelope with an open end or mouth and a closed end. The mouth is coupled to the diver's weight belt at his hip while the remainder of the envelope wraps around behind his seat and adjacent leg between his legs where it is again couple to his weight belt at his front abdomen. The legs serve as a doorway into the receiver portion of the bag. Game is pushed into the mouth of the bag with one hand, between the legs which are opened to allow passage, and into the receiver portion where it is retained by the closure of the legs on the bag. A separate latch on the mouth of the bag may be used to close the mouth although it is not required to retain the game in the receiver portion.

16 Claims, 2 Drawing Sheets

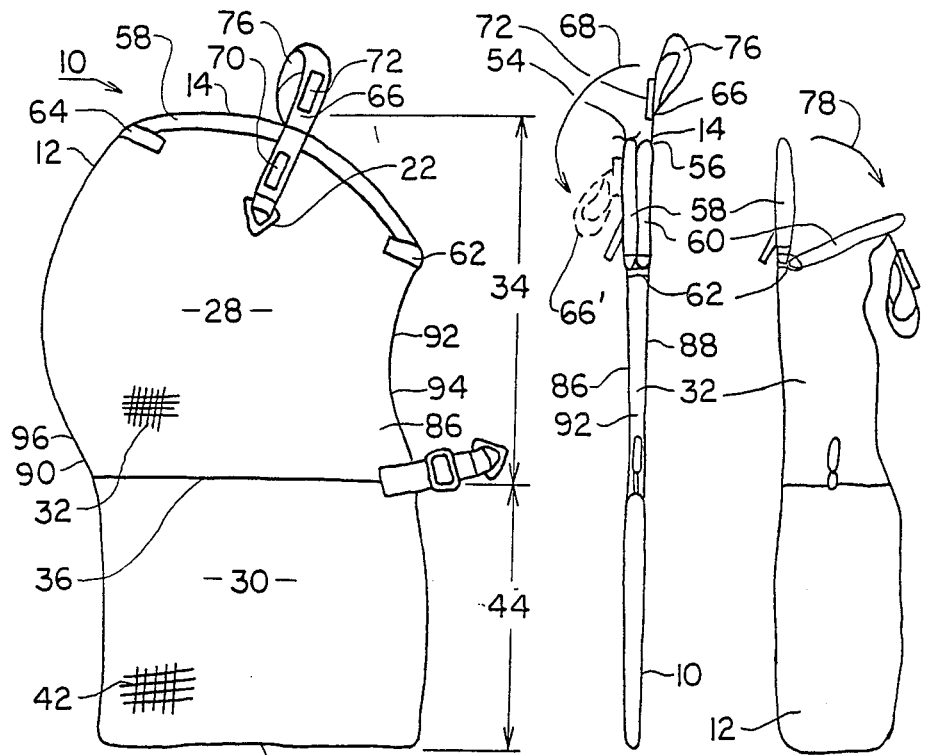
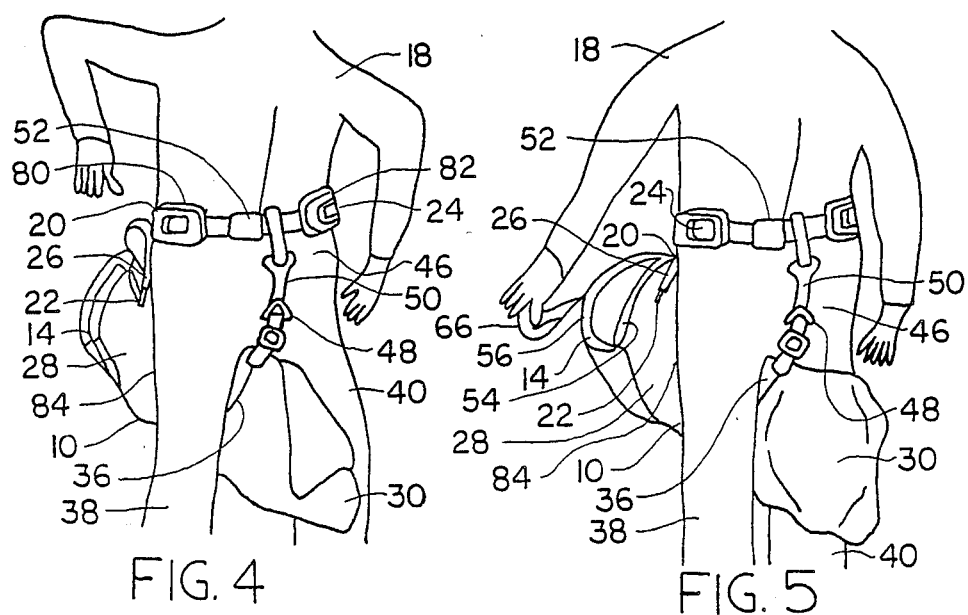

U.S. Patent    Dec. 5, 1989    Sheet 2 of 2    4,884,732

GAME BAG FOR SCUBA DIVER

TECHNICAL FIELD

The present invention pertains to the carrier art, and more particularly, to a game bag for a scuba diver.

BACKGROUND ART

A scuba diver often carries a bag for holding fish, lobsters, abalone, shell fish, and inanimate objects which he catches or finds while diving. Generally the bag is made of cloth or mesh with a large opening at the top, a latch for closing the opening, and a loop for attachment to a belt. The loop attachment causes the bag to hang down whether the diver is standing out of the water or is in the water. When he swims horizontally, the bag hangs down slowing his forward movement. When he is upside down as is often the case when he is near the bottom, the bag hangs next to his head or even drags on the bottom. The present bag is therefore best suited for use in the upright position—a position rarely used by a diver. Opening of the bag requires two hands—a difficult task when the game is in one hand and a spear gun or spear is in the other. Once opened, whatever game is in the bag may float or swim out. Nothing keeps the present game in the bag from escaping while the new game is inserted. The diver must push whatever game is presently in the bag to the bottom before trying to insert the new game—no mean task when his hands are full. Furthermore, if the latch on the bag becomes unintentionally undone, nothing keeps the game in the bag from escaping.

DISCLOSURE OF INVENTION

The present invention is directed to a game bag for a scuba diver having a flexible tubular envelope with an open end and a closed end. The open end or mouth is coupled to the diver adjacent his hip with the remainder of the envelope wrapped around behind his adjacent leg and through his two legs. The bag is divided into two portions: the insertion duct and the receiver portion. The insertion duct is the portion from the open end to the clamping position between the legs. The receiver portion is in front of the legs. The legs may therefore serve as a clamp preventing game in the receiver portion from escaping when the mouth is opened. Game is pushed into the insertion duct and the receiver portion by momentarily opening the legs. A coupling means adjacent the clamping position holds the envelope to the front of the diver's abdomen.

In accordance with one important aspect of the invention, the open end is divided into a mouth hip side and a mouth outside and includes a curved stiffener along substantially both sides of the mouth. The stiffeners are substantially parallel to each other when together and form the mouth when the centers are spread. In a preferred embodiment, a latch holds the stiffeners together to close the mouth as desired.

In accordance with another important aspect of the invention, the latch is fabricated of a hook and loop fastener material such as Velcro. In the preferred embodiment, a handle is positioned on the mouth outside in order to allow the mouth to be opened by one hand by pushing the handle away from the hip and closed by pulling the handle toward the hip.

In accordance with another important aspect of the invention, the trailing edge of the duct is cut in a concave curve toward the leading edge to curve around the contour of the diver's seat. In the preferred embodiment, the leading edge is cut in a convex curve away from the trailing edge and substantially parallel to it in order to maintain the diameter of the duct throughout the length of the duct.

BRIEF DESCRIPTION OF DRAWINGS

FIG. 1 is a hip side elevational view of a game bag in accordance with the present invention.

FIG. 2 is a trailing edge elevational view of the game bag;

FIG. 3 is a trailing edge elevational view similar to FIG. 2 with the mouth opened;

FIG. 4 is a front elevational view of the bag installed on a scuba diver;

FIG. 5 is a front elevational view similar to FIG. 4 with the mouth opened, the legs closed, and the receiver portion filled with game;

MODES FOR CARRYING OUT THE INVENTION

Figure 6:
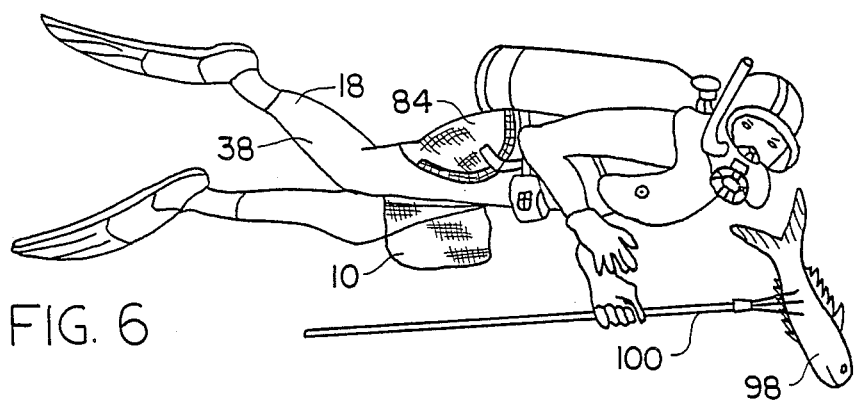
FIG. 6 is a side elevational view of a diver swimming with the bag and a fish.

Referring initially to FIG. 1, there is illustrated a hip side elevational view of a game bag for a scuba diver, generally designated 10, of the present invention. The game bag is primarily a flexible tubular envelope 12 open on one end 14 and closed on the other end 16. A means is provided for coupling the open end 14 to the diver 18 adjacent his hip 20 as shown in FIGS. 4 and 5. The means includes a hip retainer adjacent the open end in the form of a ring 22 on the bag, a belt 24 about the waist of the diver, and a clip 26 between the belt and the ring.

The envelope is divided into two parts (FIG. 1): an insertion duct 28 and a receiver portion 30. The insertion duct is preferably fabricated of a heavy duty coated netting 32 that sinks quickly and does not waterlog. Interference with swimming is thereby minimized. The slick coated surface also allows the game to be easily slid into the receiver portion. The insertion duct 28 has a first length 34 determined by the distance between the open end 14 and a clamp position 36 (FIG. 5) between the diver's legs 38 and 40 allowing the envelope 12 to be wrapped backwards around the diver's adjacent leg 38 and between his two legs.

The receiver portion 30 retains the game and is preferably fabricated of coarse woven netting 42. The coarse netting provides friction on the outside to aid the legs in holding the game in the bottom of the receiver and also snags the game on the inside tending to trap the game in the receiver even when the bag is totally open. The receiver portion 30 has a second length 44 determined by the desired length between the clamp position 36 and the closed end 16.

A means is provided for coupling the bag 10 adjacent the clamp position 36 to the diver 18 adjacent his front lower abdomen 46 as shown in FIGS. 4 and 5. The means includes an abdomen retainer adjacent the clamp position 36 in the form of a ring 48, the belt 24, and a clip 50 between the belt and the ring. The attachment of the bag 10 to the belt 24 permits the diver 18 to drop both instantly by releasing the belt buckle 52 if he gets in trouble and needs to release himself from bottom entanglements or to surface rapidly.

FIG. 2 is a trailing edge elevational view of the bag 10. The open end 14 provides a mouth for the bag and is divided into a hip side 54 and an outside 56. A curved stiffener 58 is enclosed in the fabric 32 of the bag along substantially the entire hip side of the mouth. Similarly, a curved stiffener 60 is enclosed in the fabric along substantially the entire outside. The stiffeners are preferrably fabricated of resilient tubular plastic. U-shaped rubber pieces are inserted into the adjacent stiffener ends to serve as hinges between the stiffeners. Strong webbing material 62 and 64 reinforces the fabric 32 at these hinge points as best shown in FIG. 1. The stiffeners 58 and 60 are substantially parallel to each other when together as shown in FIGS. 1 and 2. A latch 66 fabricated of strong webbing attached to the outside 56 and an attachment on the hip side 54 closes the mouth when pulled in the direction shown by the arrow 68 down over the mouth hip side into the position represented by the dashed outline 66'. Hook and loop fastener material such as sold under the trademark Velcro provides the preferrable latching means. One of the hook or loop portions 70 is attached to the hip side as shown in FIG. 1 while the complementary portion 72 is on the webbing coupled to the outside 56. Preferrably the webbing includes a handle 74 created by twisting the webbing into a loop 76. The handle aids the diver in opening the mouth with one finger by pushing the handle away from the hip 20 as shown in FIGS. 3 and 5 and closing the mouth by pulling the handle toward the hip as shown in FIGS. 2 and 4.

FIG. 3 is a trailing edge elevational view similar to FIG. 2 with the mouth opened as shown by the arrow 78. When the curved stiffeners 58 and 60 are opened about the hinges under the reinforcements 62 and 64, they pull the fabric 32 of the envelope 12 out into an oval tube.

FIG. 4 is the front elevational view of the bag 10 installed on a scuba diver 18 while the diver is standing up which has been referred to previously with respect to FIGS. 1 and 2. The bag is suspended on the diver from the clips 26 and 50 on his weight belt 24 between his legs 38 and 40. FIG. 4 clearly shows that the release of the bag from his body is therefore easily achieved by the lifting of the belt buckle 52 releasing the weight belt. The belt 52 falls away rapidly from his abodomen 46 due to the weight of the weights 80 and 82 carrying the bag 10 down off his legs.

FIG. 5 is a front elevational view similar to FIG. 4 with the mouth of the bag 10 opened, the legs closed, and the receiver portion 30 filled with game. The mouth is easily opened by pulling on the handle 66 with one finger creating an oval opening between the mouth hip side 54 and the mouth outside 56. There is no danger of the game in the receiver from escaping through the mouth because the legs 38 and 40 trap the game in the bag at the clamping position 36. However, new game may be inserted in the receiver through the open mouth and the legs opened momentarily to force the new game into the receiver. The game previously in the receiver cannot escape as the new game is inserted because the new game fills the space between the legs as it is being forced into the receiver.

As shown in FIGS. 4 and 5, the bag 10 fits snugly under the seat 84 of the diver. In order to better conform to the diver's seat, the insertion duct 28 is curved. As shown in FIGS. 1 and 2, the insertion duct has a duct hip side 86 and a duct outside 88. The duct hip side is coupled to the mouth hip side 54 and the duct outside is coupled to the mouth outside 56. The flexible envelope 12 between the mouth hip side and outside and the duct hip side and outside forms a leading edge 90 toward the front of the diver and a trailing edge 92 toward the back of the diver. The trailing edge 92 is cut in a concave curve 94 toward the leading edge to better curve around the contour of the diver's seat. While the fabric 32 of the insertion duct 28 would curve under the diver's seat anyway, bunching of the fabric would occur which might snag on the game as the game is being inserted. Also, bunched fabric in the diver's crotch would be uncomfortable. In the preferred embodiment, the leading edge 90 is cut in a convex curve 96 away from the trailing edge and substantially parallel thereto in order to maintain the diameter of the duct throughout its length. Restriction on the insertion of game into the receiver portion 30 is thereby minimized.

FIG. 6 is a side elevational view of the diver 18 swimming with the bag 10 and a fish 98 empaled on a spear 100. The empty bag drapes over the diver's seat 84 and leg 38 creating little drag to the forward motion of the diver.

Figure 7:
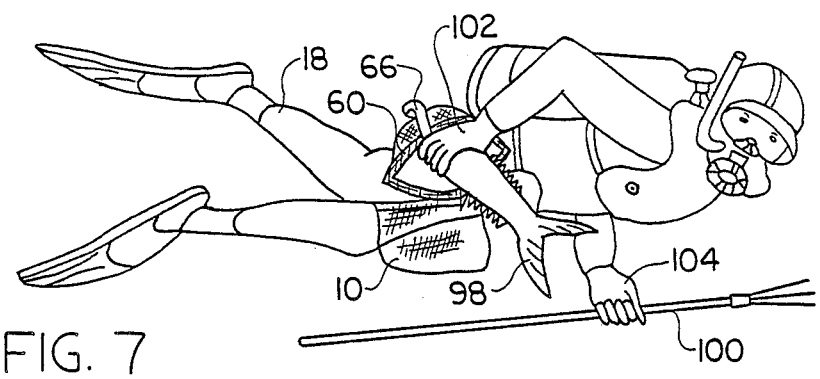
FIG. 7 is a side elevational view similar to FIG. 6 with the fish being inserted into the bag.

FIG. 7 is a side elevational view similar to FIG. 6 with the fish 98 being inserted into the bag 10. The diver 18 is only using one hand 102 to hold the fish 98, open the bag, and insert the fish into the bag. The other hand 104 is being used to hold the spear 100. Other game bags typically require the diver to use two hands to open the bag and insert the game. In order to be able to do this, the diver must stow his spear on the bottom or attach it to his belt. The present bag 10, however, is easily opened with one hand either by pulling on the latch 66 with one finger as shown in FIG. 5 or by leaving the latch undone and simply pushing against the outside mouth stiffener 60.

Figure 8:
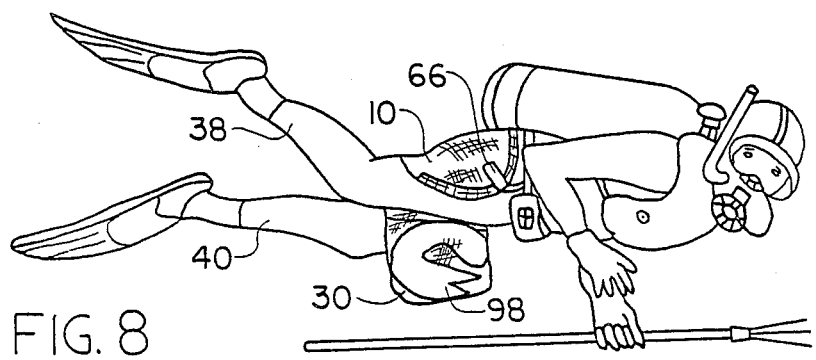
FIG. 8 is a side elevational view similar to FIG. 7 with the fish in the bag.

FIG. 8 is a side elevational view similar to FIG. 7 with the fish 98 in the receiver portion 30 of the bag 10. The latch 66 is shown as being closed although closure of the latch is not necessary in order to keep the fish in the receiver because the bag passes between the diver's two legs 38 and 40 which are always next to each other in the normal swimming position. Furthermore, the legs are continuously moving which causes constant confusion for the game. Only when the diver wishes to insert new game into the receiver does he separate his legs and then only just enough to slip the new game through.

In view of the above, it may be seen that a game bag for a scuba diver is provided. Of course, the structure may be variously implemented depending upon specific applications. Accordingly, the scope hereof shall not be referenced to the disclosed embodiment, but on the contrary, shall be determined in accordance with the claims as set forth below.

I claim:
1. A game bag for a scuba diver, comprising:
   a flexible tubular envelope having a selectively open end and a closed end;
   a means for coupling the open end to the diver adjacent his hip;
   the envelope further having:
   a first predetermined length defining an insertion duct between the open end and a clamp position between the diver's legs allowing the envelope to be wrapped backwards around the diver's adjacent leg and between his two legs; and a second predetermined length defining a receiver portion between the clamp position and the closed end; and means for coupling the envelope adjacent the clamp position to the diver adjacent his front lower abdomen.

2. A game bag according to claim 1 wherein the open end is divided into a mouth hip side and a mouth outside and further including:

a curved stiffener along substantially the entire mouth hip side; and a curved stiffener along substantially the entire mouth outside and substantially parallel to the mouth hip side stiffener when the stiffeners are together;

whereby a mouth with stiffened sides is formed when the stiffeners are separated at their centers.

3. A game bag according to claim 2 wherein the stiffeners are resilient.

4. A game bag according to claim 3 wherein the resilient stiffeners are fabricated of tubular plastic.

5. A game bag according to claim 2 and further including a latch for selectively holding the stiffeners together to close the open end.

6. A game bag according to claim 5 wherein the latch is fabricated of a hook and loop fastener material having a hook portion and a loop portion, one of the hook and loop portions coupled to the mouth hip side and the other of the hook and loop portions coupled to the mouth outside.

7. A game bag according to claim 6 and further including a handle on the mouth outside whereby the open end is selectively opened by pushing the handle away from the hip and is selectively closed by pulling the handle toward the hip.

8. A game bag according to claim 7 wherein:

the insertion duct has a duct hip side and a duct outside;

the duct hip side is coupled to the mouth hip side;

the duct outside is coupled to the mouth outside;

the flexible envelope between the mouth hip side and outside and the duct hip side and outside forms a leading edge toward the front of the diver and a trailing edge toward the back of the diver; and the trailing edge is cut in a concave curve toward the leading edge;

whereby the trailing edge curves around the contour of the diver's seat.

9. A game bag according to claim 8 wherein the leading edge is cut in a convex curve away from the trailing edge and substantially parallel thereto whereby the diameter of the duct remains substantially the same throughout the first predetermined length.

10. A game bag according to claim 2 wherein:

the insertion duct has a duct hip side and a duct outside;

the duct hip side is coupled to the mouth hip side;

the duct outside is coupled to the mouth outside;

the flexible envelope between the mouth hip side and outside and the duct hip side and outside forms a leading edge toward the front of the diver and a trailing edge toward the back of the diver; and the trailing edge is cut in a concave curve toward the leading edge;

whereby the trailing edge curves around the contour of the diver's seat.

11. A game bag according to claim 10 wherein the leading edge is cut in a convex curve away from the trailing edge and substantially parallel thereto whereby the diameter of the duct remains substantially the same throughout the first predetermined length 12. A game bag according to claim 1 wherein:

the open end is divided into a mouth hip side and a mouth outside;

the means for coupling the envelope to the diver adjacent the hip includes a hip retainer adjacent the mouth hip side and a belt worn about the waist of the diver, the hip retainer selectively attaching to the belt; and the means for coupling the envelope to the diver adjacent the lower abdomen includes an abdomen retainer adjacent the clamp position and the belt, the abdomen retainer selectively attaching to the belt.

13. A game bag according to claim 2 wherein:

the open end is divided into a mouth hip side and a mouth outside;

the means for coupling the envelope to the diver adjacent the hip includes a hip retainer adjacent the mouth hip side and a belt worn about the waist of the diver, the hip retainer selectively attaching to the belt; and the means for coupling the envelope to the diver adjacent the lower abdomen includes an abdomen retainer adjacent the clamp position and the belt, the abdomen retainer selectively attaching to the belt.

14. A game bag according to claim 13 and further including a latch for selectively holding the stiffeners together to close the open end.

15. A game bag according to claim 14 wherein the latch is fabricated of a hook and loop fastener material having a hook portion and a loop portion, one of the hook and loop portions coupled to the mouth hip side and the other of the hook and loop portions coupled to the mouth outside.

16. A game bag according to claim 15 and further including a handle on the mouth outside whereby the open end is selectively opened by pushing the handle away from the hip and is selectively closed by pulling the handle toward the hip.

* * * * *